United States Patent [19]

Gianzero et al.

[11] Patent Number: 5,045,795

[45] Date of Patent: Sep. 3, 1991

[54] AZIMUTHALLY ORIENTED COIL ARRAY FOR MWD RESISTIVITY LOGGING

[75] Inventors: Stanley C. Gianzero, Austin; Paul Sinclair, Clearlake Shores; Roland E. Chemali; Shey-Min Su, both of Austin, all of Tex.

[73] Assignee: Halliburton Logging Services Inc., Houston, Tex.

[21] Appl. No.: 550,842

[22] Filed: Jul. 10, 1990

[51] Int. Cl.$^5$ .................................................. G01V 3/28
[52] U.S. Cl. .................................... 324/342; 324/339; 324/369; 336/229
[58] Field of Search ............... 324/339, 342, 343, 332, 324/333, 334, 338, 344, 347, 366, 357; 336/83, 212, 214, 221, 229, 233, 234

[56] References Cited

U.S. PATENT DOCUMENTS

| | | | |
|---|---|---|---|
| 3,305,771 | 2/1967 | Arps | 324/342 |
| 3,377,549 | 4/1968 | Newman et al. | 324/342 |
| 3,381,215 | 4/1968 | Osborn | 324/342 |
| 3,408,561 | 10/1968 | Redwine et al. | 324/342 |
| 4,786,874 | 11/1988 | Grosso et al. | 324/373 X |

Primary Examiner—Kenneth A. Wieder
Assistant Examiner—Warren S. Edmonds
Attorney, Agent, or Firm—William J. Beard

[57] ABSTRACT

A coil array which is installed on a MWD drill collar for use in a resistivity logging system. The drill collar is provided with upper and lower coil support rings. These are toroids which support individual coil segments, and are connected by suitable magnetic shorting bars. The coil segments and shorting bars inscribe a specified solid angle or azimuthal extent. By connecting the outputs of the several coils through a combining circuit, the coils on a single coil form can be connected in series additive, or subtractive relationship. Through the use of two such coil forms with aligned coils on each, an azimuthally oriented window is thereby defined. By proper switching multiple azimuthally oriented windows can be made operative so that there is an azimuthal orientation to the current flow pattern relative to the MWD resistivity logging tool.

9 Claims, 3 Drawing Sheets

AZIMUTHALLY ORIENTED COIL ARRAY FOR MWD RESISTIVITY LOGGING

BACKGROUND OF THE DISCLOSURE

This is directed to azimuthally sensitive resistivity logging devices in the context of a measuring while drilling (MWD) system. It provides a set of toroids installed for measurement from a drill collar supported MWD system which provides both a conventional axisymetric current sensitivity as well as azimuthally focused directional sensitivity.

The present disclosure is particularly adapted for use in a MWD system mounted in the sidewall of a drill collar. A drill collar is a joint of drill pipe which has an extra thick wall where the present apparatus is normally installed. This disclosure sets forth an antenna system (several coils) which cooperates with the resistivity measuring apparatus so that the received current can be focused in alternate formations. The teachings of J.J. Arps in U.S. Pa. No. 3,305,771 define the current or conventional method. It is however, a set of coils which can be operated so that, in one connection, the current flow through the formation is in a horizontal plane (normal to a vertical well) and symmetrically in all azimuthal directions around the tool axis. In another mode of operation of the equipment, the current flow through the formation is sensed in a particular azimuthal direction. By the appropriate combination of coil connections described hereinafter, the present system so deploys the toroid coils that differential signals are taken between currents measurements at selected windows or locations on the drill collar and a highly sensitive response is obtained. This sensitivity can be used to determine the particular location of the wall borehole because it provides information about the location of the drill collar relative to adjacent conductive rock beds, particularly in deviated wells, and ultimately even in horizontal drilling of a deviated well. For descriptive purposes, the tool is set forth in a vertical well and references to horizontal and vertical should be viewed in that context. This does not preclude use in a deviated well, or even in a horizontal well.

The method described in U.S. Pat. No. 4,786,874 contemplates the asymetrical generation of current in the formation by a current electrode place on one side of the drill collar, and the sensing of formation asymetrical voltage distribution by a voltage sensing electrode, with both electrodes placed on an insulated section of the drill collar. The insulated section of drill collar is a severe drawback in the disclosed system because it is structurally fragile and capable of breaking during drilling. By contrast, the present invention attacks and solves this problem by generating an axisymetric current flow from a transmitting toroid spaced at some distance from the receiver coils described hereinafter, and sensing the perturbations of the current flow caused by asymetry in the formation conductivity wherein the perturbations are sensed by the unique receiver coil configuration.

The present disclosure sets out a window array which preferably has two coils thereon where the window array is approximately rectangular in shape. The top and bottom edges of the rectangular window coil toroids are arranged at the same azimuth on the drill collar. The remaining two sides of the window coil toroids are vertical along the drill collar, thus defining a four sided window permitting current to flow through the window. This kind of construction with appropriate switching provides a plurality of coil segments which can be connected to form a current focusing window in the form of a four sided window which directs current flow through the adjacent formations based on the geometry and azimuth of that particular window. By means of a signal combining circuit, the coils can be rearranged cooperative with other and similar coil defined windows at the same or different locations on the drill collar so that conventional current flow patterns can occur. This is particularly helpful where a deviated well is drilled. Ordinarily, a well is drilled vertically for at least a portion of its depth. After vertical drilling has penetrated the earth to a certain depth, it is then often necessary to deviate the well. To illustrate the point, assume that a well is drilled vertically for several thousand feet and is then deviated to a horizontal direction. When it is vertical, it is typically normal to the geological formations traversed by the borehole. The present apparatus is able to operate when the wells are vertical. The current is injected in all directions through the adjacent formations to provide resistivity measurements of the respective formations penetrated by the well borehole. However, when the well is deviated to horizontal, it may be necessary to guide the horizontal drilling process so that the horizontal portion is formed entirely within a single formation. Assume that the formation has definitive top and bottom boundaries with electrical resistivity different from that of the formation, and is of substantial interest for possible production. In that case, the horizontal drilling process may involve guiding the well during drilling to assure that it is approximately centered between the top and bottom boundaries of the formation. If the formation is thirty feet thick, this provides a quite narrow target for the horizontal portion of the well borehole. In this instance, it is very helpful to convert from sensing current flow patterns which are symmetrical in all directions to a focused azimuthal current sensing mode of operation. The present apparatus contemplates a dual mode of operation so that the toroids arranged around the drill collar sense current in preferred azimuthal directions thereby providing a focus which is able to indicate resistivity along particular directions. One important benefit of this is the ability to distinguish changes in resistivity as the well deviates within the formation of interest and begins to approach either the upper or lower boundaries thereof. The current flow region is thus distorted in a particular azimuthal direction, yielding a measure of resistance contrast, and that measure is tied to the precise position of the measuring equipment at the instant of that current reading so that the resistivity data indicates the location of the interfaces defining the formation of interest. An example will be given so that this will become more clear hereinafter. The virtues just mentioned represent features which are an advance over the art, one representative structure being the ELIAS tool of Bureau de Recherches Geologiques et Minieres. This also is an advance over U.S. Pat. No. 4,786,874 which discloses a system showing a MWD tool having isolated current injection electrodes 30 at specific locations thereon.

The present apparatus also incorporates a method of operation which permits simultaneous measurement of uniform current injection in axisymetric directions and one which is specific for a particular azimuth.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
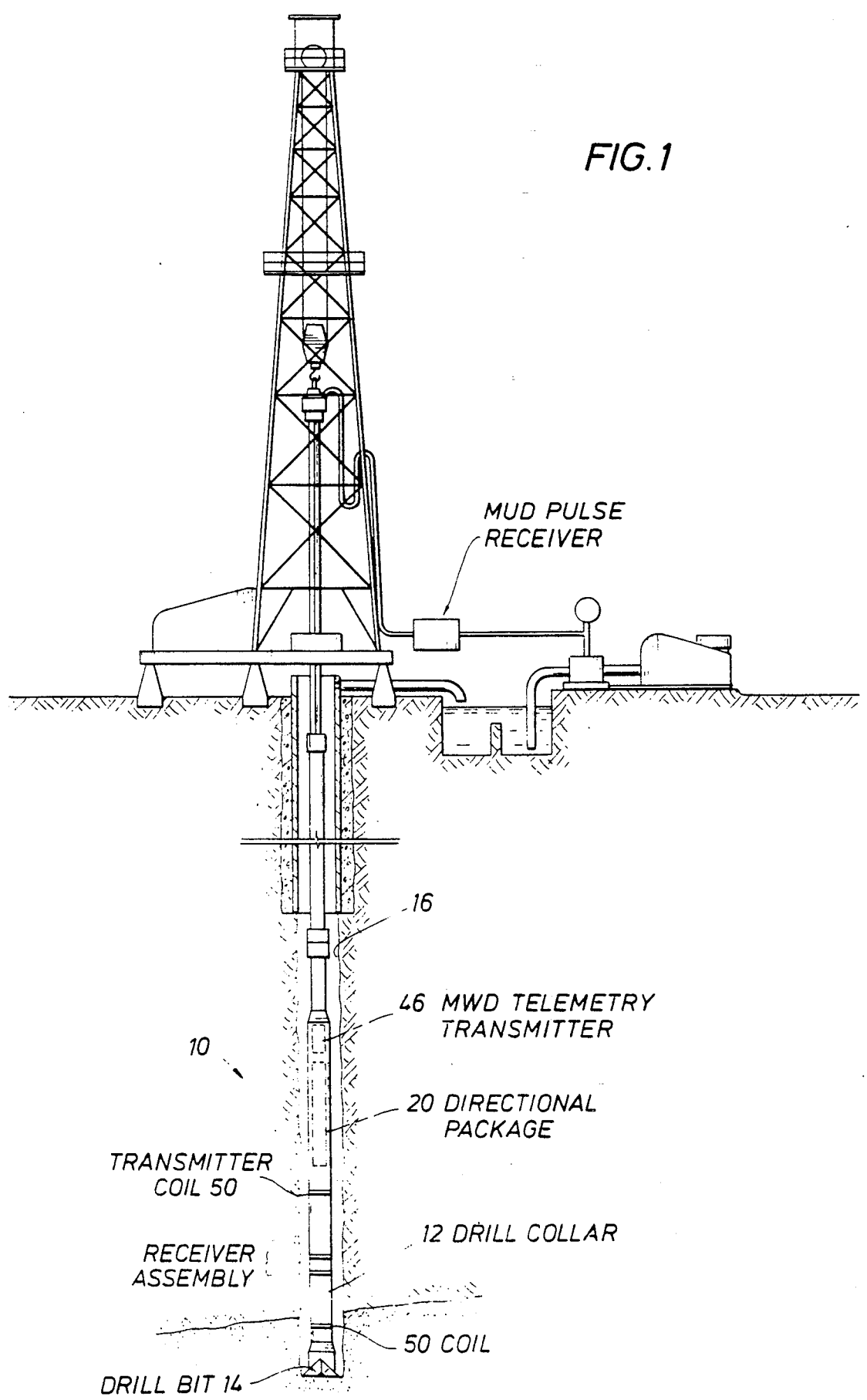
FIG. 1 shows a MWD logging system used in drilling a well wherein a drill collar encloses a MWD measuring tool incorporating a coil section in accordance with the teachings of the present disclosure.

Attention is now directed to FIG. 1 of the drawings where the numeral 10 identifies a resistivity measuring apparatus which is incorporated in a drill collar 12 which is threaded in the drill stem just above a drill bit 14 for drilling purposes. An open hole is shown at 16, it being appreciated that the hole is normally filled with drilling fluid which is pumped down into the well borehole 16 from the surface. The drill collar 12 is threaded to and serially connected with a drill string 18 made up of drill pipe which may be rotated by a rotary drilling rig at the surface. The drill string is rotated in the normal or vertical drilling procedure. The drill string may be pushed into deviated wells without rotation. The collar 12 is assumed for descriptive purposes to be vertical but this disclosure applies to all angles of wells. The MWD equimpment in the present apparatus includes a set of directional sensors 20 which are mounted in the drill collar. In addition, there is an electronics package which provides suitable signals for control and operation of the resistivity measuring equipment. The electronics package includes a conventional resistivity logging tool. It is provided with a system of coils in the coil section built into the sidewall of the drill collar 12. The output of the system is not otherwise distinguishable when it is being operated in the symmetrical on the azimuthally sensitive current flow pattern. That is, current is injected into the adjacent formations in the conventional fashion using one or more current transmitting toroidal coils and one or more current sensing toroidal coils, so that measurements are obtained thereby. To this end, an array of coils will be included, that is, coils for injecting and sensing the current in the formation. There may be guard coils to localize current flow and other coils deployed in the equipment. They remain unaltered and function in the ordinary fashion.

Figure 2:
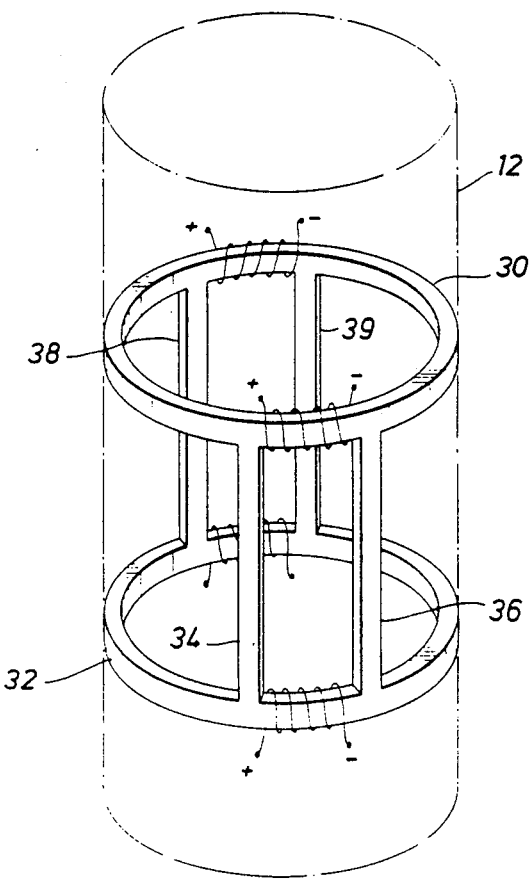
FIG. 2 is an enlarged detailed view of coils installed at a azimuthally directed window having four sides and supporting four coil sections wherein the currents flowing in the coils are selectively recombined to provide azimuthal and symmetrical current sensing.

One important feature of the present disclosure is directed to the current sensing coils which are included in the drill collar 12. For a better understanding of this, attention is now directed to FIG. 2 of the drawings where the numeral 12 identifies the supportive drill collar. It is shown in simplified fashion with the axial passage therethrough omitted. The collar 12 supports a window which faces in a particular direction. For purposes of definition, the 360° of azimuth is divided in this instance into four windows which each encompass various angles chosen to provide various degrees of focussing. That is to say, there is a coil support form which is an upper receiver toroid 30, and it supports two coils thereon. The coils are described hereinafter for nomenclature purposes as A, B, C and D so that there are coils $30_A$, $30_B$, $30_C$ and $30_D$ where the subscripts refer to the four positions on the coil forms. In addition, there is a lower receiver coil support 32 and it likewise supports two coils which are indicated by appropriate subscripts. The upper and lower toroids 30 and 32 are joined by vertical bars. The vertical bars define azimuthally oriented rectangular windows. The coil support forms and the vertical bars are constructed of a suitably laminated ferromagnetic material with a high magnetic permeability. This assembly constitutes a magnetic circuit having four possible closed loops (toroids) through which magnetic flux may circulate, and which define four windows. As shown in FIG. 2, the vertical bars 34 and 36 cooperate with the coils $30_B$ and $32_B$ to define a window that encloses a current sensing electrode on the surface of the drill collar. This window is duplicated at other locations; a description of one window will suffice for all the windows. The window is thus defined by two straight line segments and two sections of arc of toroidal magnetic circuits.

Each of the coils terminates at two-end connected teminals. Thus, a particular coil is made of a specified number of turns between the two ends. The two output conductors from the coil encompass that specified number of turns. Ideally, the two coils $30_B$ and $30_C$ are identical in turns, and the toroids are identical. Symmetry is preferably preserved between the toroids 30 and 32 so that certain subtractive steps or additive steps in operation create symmetrical results. Also, the angles encompassed by windows defined by the coil positions may preferably be less than 90°, for example 30°, to provide more directional focussing of the azimuthal current sensing.

In FIG. 2, the opposite coils on the toroids 30 and 32 define a opposite facing toroid window. Again, like the first window, it is formed of two segments or 38 and 39. The coils at the top and bottom of that window bear the notations $30_A$ and $30_D$.

Figure 3:
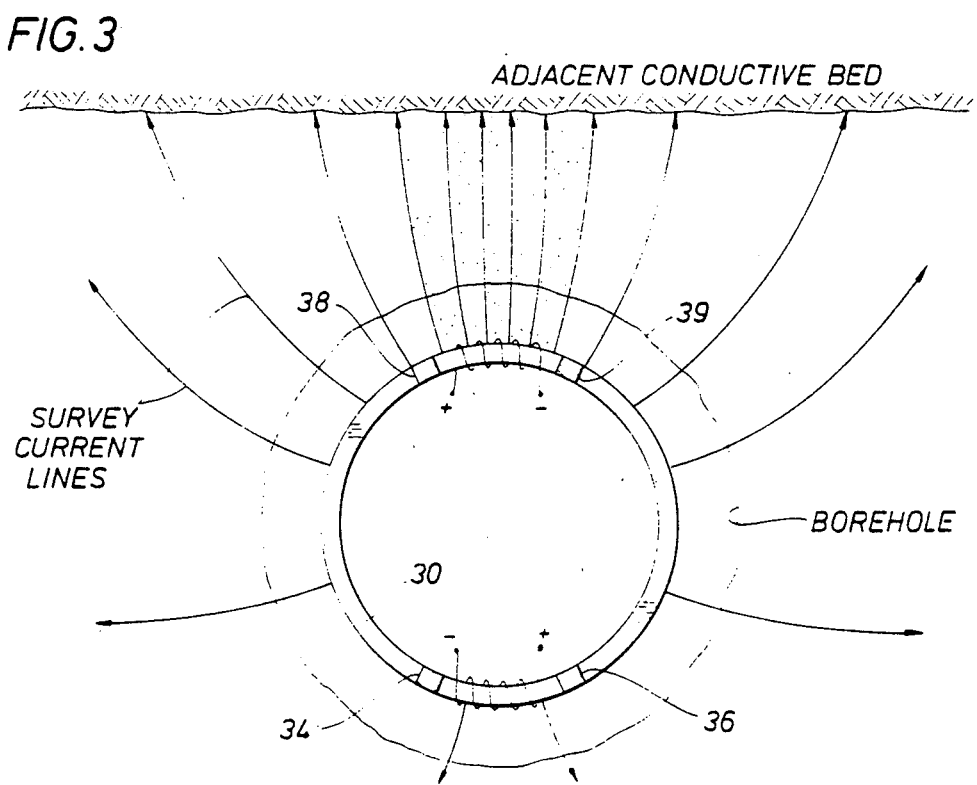
FIG. 3 is a sectional view through the drill collar of FIG. 2 showing field lines from the coil elements.

FIG. 3 of the drawings shows a typical focused field pattern. Note that the toroid 30 is shown, and the coupling bars 34, 36, 38 and 39 are likewise included. Depending on the manner in which the various coils are used, the current sensed is preferentially directed along a particular azimuth. The arrangement shown in FIG. 3 illustrates how focused current lines provide an azimuthal preference around the MWD drill collar. As will be described, this is particularly useful where the drill collar is in a deviated portion of the well. If, for instance, the well is horizontal at this location, the lines of flux shown in FIG. 3 may well extend upwardly to the bed boundary defining the formation in which the well is drilled. This can be used as a control mechanism to thereby provide a mechanism for centering the well at a particular location in the formation, typically equidistant from the top and bottom boundaries of the bed.

Figure 4:
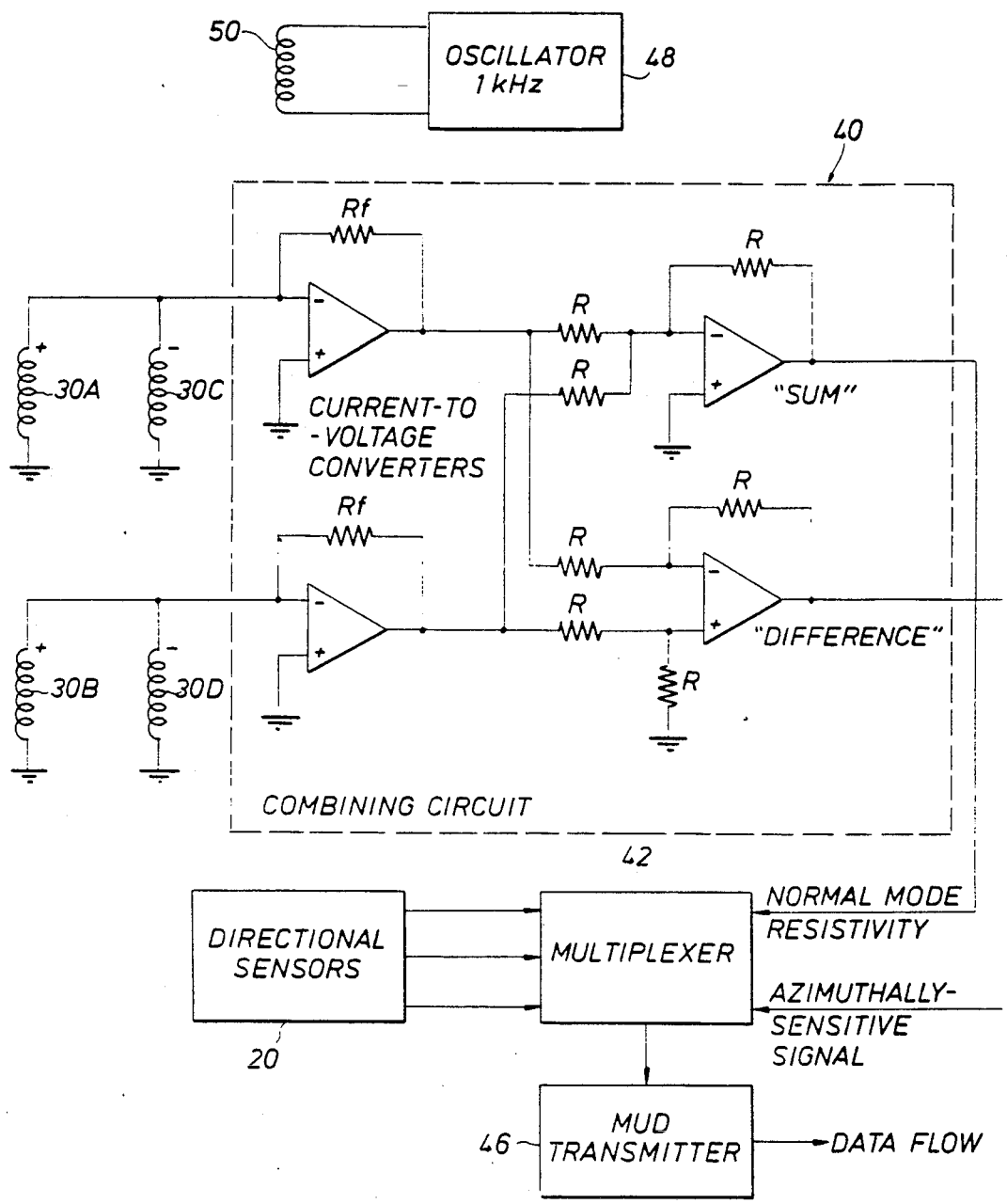
FIG. 4 is a schematic block diagram of a signal combination circuit and multiplexer for converting the data so that coil signals are summed to provide different indications.

Going now to FIG. 4 of the drawings, the present apparatus further includes multiple coils as indicated there and they are connected to a combining circuit 40. There is also a current generating circuit 48 which is preferably a sinusoidal oscillator operating at a frequency of about 1 khz, that energizes a transmitting toroidal coil 50. In an alternative method, two transmitting toroidal coils are energized simultaneously, and are spaced at equal distance above and below the receivers. The combining circuit provides summed signals, as will be described, to a multiplexer 42. Additional input to the multiplexer 42 are positional signals indicating the directional orientation in space of the MWD drill collar. The sensors 20 are input to the multiplexer 42. That provides an output signal to the MWD transmitter 46 which forms a data string which is sent to the surface. Considering now the details of FIG. 4, a representative example of operation will show how the combining circuit 40 is operated. Assume as an easy example, that the MWD system is in a vertical portion of the hole and that the adjacent formations are horizontal, or they are normal to the well borehole. Assume further that conventional resistivity logging operations are to be carried out with this equipment. In that event, the members 30, 32, 34, 36, 38, 39 (see FIG. 2) support multiple coils and in one embodiment, support the coils $30_A$, $30_B$, $30_C$ and $30_D$. These four coils are operated by the combining circuit so that the signal currents from $30_A$ and $30_B$ are additive and the signal currents from $30_C$ and $30_D$ are subtractive. If this is done, the coil array is operated so that the current flow relative to the well borehole includes all directions 360° around the well borehole. In other words, directional preferences are avoided. This can be done with the four coils 30 which are input to the combining circuit 40. In summary, the circuit 40 operates to connect the four coils 30 so that they operate in the traditional fashion heretofore. Consider, however, another sequence of operations for the circuit 40. Assume that the azimuthal preference is desired. In that instance, the combining circuit operates so that the signal currents from $30_A$ and $30_C$ are additive, while the signal currents from $30_B$ and $30_D$ are subtractive. In summary, the combining circuit operates to define the azimuthally directed rectangular toroids made of four coil segments in one version and generate an appropriate output signal, while also operating to define two receiver toroidal sections in traditional fashion and generating another appropriate output signal. Periodically, it is important to operate the directional sensors 20 to provide outputs which indicate the relative position in space of the drill collar supporting the MWD equipment. FIG. 1 is idealistic in the sense that is shows a vertical well borehole which is normal to horizontal formations adjacent to the borehole. Either unintentionally or subject to control, the well may be deviated slightly or substantially. In this process, it is important to know the relative angular position in a three dimensional coordinate system of the drill collar so that the directional sensors 20 form such indications whereby the position of the well in space is identified. Assume, for instance, that the drill collar is substantially horizontal and is travelling through a particular formation in horizontal direction and that the formation is also horizontal. It will then be defined by upper and lower bed boundaries. Assume further that there is a contrast in resistivity between the formation and the adjacent formations which sandwich this formation. Under that assumption, the position of the borehole through the formation is important, and particularly it should be located relative to the top and bottom interfaces of the formation. If there is a difference in resistivity, there will be a response in the resistivity measurement which is focused by the azimuthally preferential toroids on the drill collar. Assume, for purposes of illustration, that the azimuthal toroids of interest are directed in a vertical plane parallel to the tool axis. At this juncture, however, since the well has deviated vertical to horizontal, this will obtain a reading which is directed at one instant upwardly or out of the formation toward the top boundary or interface above the horizontal well. The drill string may be subsequently rotated so that the direction of preference is downwardly. Signals from the sensors 20 are important to determine the relative angular orientation in space of the drill collar. In this particular instance, the coils 30 are operated to make measurements in the direction of preference, and specifically make a differential measurement between opposite rectangular toroid windows.

Another mode of operation is to make measurements using a single rectangular toroid window. This would thus involve a measurement from the window defined by the coils $30_B$ and $30_C$. In other words, the window may provide a single directional resistivity measurement. However, in the previously described embodiment, the windows are on opposite sides of the drill collar, and the differential current sensing rather sharpens the directional preference otherwise involved in the rotating coils of this embodiment.

As can be understood, the combining circuit is thus operated to group the coils in an additive or subtractive arrangement. In some instances, one or the other signal is not required and may be removed from the data flow by switching. Moreover, the switching occures subject to a pattern which can be readily input to the multiplexer 42. To this end, switching circuits are provided with switch control signals either from the surface or from a repetitive pattern which is stored in the MWD equipment. These signals simply direct the control of the switches to accomplish the results just described.

Describing the combining circuit 40 in more detail, the sensed currents in coils $30_A$ and $30_C$ are combined in opposite polarity by means of an anti-parallel connection and an input to an operational amplifier and feedback resistor $R_f$ configured to perform a current-to-voltage transformation. This conversion technique is well known in the art of electronic amplifier design. Similarly the coils $30_B$ and $30_D$ are connected to a similar amplifier, the two signal voltages now being supplied to a summing amplifier (for normal resistivity mode) and a difference amplifier (for the azimuthally sensitive mode). Thus, the two signal outputs are available simultaneously to the multiplexer for transmission to the surface. While the foregoing is directed to the preferred embodiment, the scope is determined by the claims which follow.

What is claimed is:

1. A coil array for a MWD resistivity logging system wherein the coils are installed on an elongate generally cylindrical support member, and the coils comprise a pair of first and second circumferential coil support forms each of which supports separate first and second coils thereon and wherein said first circumferential form is positioned at a specified location along said support member, and having two diametrically opposite coils wound thereon, said second and parallel circumferential coil support form having two diametrically opposite coils wound thereon, and wherein all of said coils are collectively connected to switching means for combining signals therefrom and for generating signals corresponding to various connections of the several coils.

2. The apparatus of claim 1 wherein said coil support forms are spaced apart along said cylindrical support member, thereby defining a space between said coil support forms and wherein said coil support forms further have two pair of diametrically opposed parallel framing members extending between said coil support forms so that two azimuthally directed windows are defined thereby and wherein each of said windows includes at least one coil wound along the parallel edges of said window.

3. The apparatus of claim 2 wherein on of said coils is at the top edge of said window and is supported on one of the coil support forms and the other of said coils is at the bottom edge of said window and is supported by the other of said coil support forms.

4. The apparatus of claim 2 wherein each of said coil support forms comprises high permeability magnetic material that confines and directs magnetic flux within said coils.

5. The apparatus of claim 4 wherein said window is directed along a particular azimuth relative to the axis of said cylindrical support member and said support member is subject to rotation along the axis thereof so said window is rotated about the central axis of said cylindrical support member.

6. The apparatus of claim 5 wherein said window, subtends an included angle from the axis of said support member that defines a solid angle for rotational focussing of current sensing.

7. The apparatus of claim 1 wherein said coil support forms are spaced above and below a defined region of the cylindrical support member and that region encloses a paid of azimuthally preferential windows which are 180° diametrically opposite one another.

8. A method of sensing current flow relative to a resistivity logging system supported in a MWD apparatus, the method comprising the steps of:
   (a) positioning at last a pair of diametrically opposed separate coils at different circumferential azimuths but on a common coil support form about a circumference of a drill collar; and
   (b) combining additively or subtractively according to a predetermined relationship currents flowing in the individual coils on the coil form to sense symmetrical current flow in all directions around the coil form or to controllably provide azimuthally preferential current sensing.

9. The method of claim 8 wherein said azimuthally preferential current sensing signal is interpreted to indicate the resistivity contrast and distance to an adjacent rock formation boundary.

* * * * *